US011962984B2

(12) United States Patent
Patros et al.

(10) Patent No.: US 11,962,984 B2
(45) **Date of Patent: *Apr. 16, 2024**

(54) OPTIMAL CROSSTALK CANCELLATION FILTER SETS GENERATED BY USING AN OBSTRUCTED FIELD MODEL AND METHODS OF USE

(71) Applicant: Google LLC, Mountain View, CA (US)

(72) Inventors: Elliot M. Patros, San Diego, CA (US); David E. Romblom, San Mateo, CA (US); Robert J. E. Dalton, Jr., San Francisco, CA (US); Peter G. Otto, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,069

(22) Filed: Feb. 13, 2023

(65) Prior Publication Data

US 2023/0269536 A1 Aug. 24, 2023

Related U.S. Application Data

(63) Continuation of application No. 17/295,144, filed as application No. PCT/US2019/062381 on Nov. 20, 2019, now Pat. No. 11,589,162.

(Continued)

(51) Int. Cl.
*H04R 5/033* (2006.01)
*H04R 5/04* (2006.01)
(Continued)

(52) U.S. Cl.
CPC ............... *H04R 5/033* (2013.01); *H04R 5/04* (2013.01); *H04S 3/00* (2013.01); *H04S 7/00* (2013.01)

(58) Field of Classification Search
CPC .. H04R 5/033; H04R 5/04; H04S 3/00; H04S 7/00; H04S 1/00; H04S 7/30; H04S 2420/01
(Continued)

(56) References Cited

U.S. PATENT DOCUMENTS 10,306,396 B2 5/2019 Romigh
10,966,026 B2 3/2021 Liu et al.
(Continued)

FOREIGN PATENT DOCUMENTS

CN 1860826 A 11/2006
CN 101212834 A 7/2008
(Continued)

OTHER PUBLICATIONS

International Search Report and Written Opinion for PCT/US2019/062381 dated Jan. 24, 2020, all pages.
(Continued)

*Primary Examiner* — Xu Mei
(74) *Attorney, Agent, or Firm* — Kilpatrick Townsend & Stockton LLP

(57) ABSTRACT

A crosstalk cancellation filter set configured for use in delivering binaural signals to human ears is provided. The crosstalk cancellation filter set includes a pressure matching system configured to perform spatial filtering or sound field control and an obstructed field model in communication with the pressure matching system. The crosstalk cancellation filter set is configured to take acoustic advantage of scattering effects and occlusional effects caused by violations to a free-field assumption, thereby delivering improved crosstalk cancellation acoustic displays to a listener without the use of headphones.

18 Claims, 3 Drawing Sheets

Related U.S. Application Data

(60) Provisional application No. 62/770,373, filed on Nov. 21, 2018.

(51) Int. Cl.
*H04S 3/00* (2006.01)
*H04S 7/00* (2006.01)

(58) Field of Classification Search
USPC ................................ 381/17, 18, 309, 26, 74
See application file for complete search history.

(56) References Cited

U.S. PATENT DOCUMENTS

| | | | | |
|---|---|---|---|---|
| 11,197,118 | B2 | 12/2021 | Dicker et al. | |
| 11,589,162 | B2 * | 2/2023 | Patros | H04S 7/00 |
| 2007/0110250 | A1 | 5/2007 | Bauck | |
| 2015/0208166 | A1 * | 7/2015 | Raghuvanshi | H04S 7/303 381/71.6 |
| 2015/0373477 | A1 * | 12/2015 | Norris | H04M 1/605 381/303 |
| 2017/0339508 | A1 | 11/2017 | Norris et al. | |

FOREIGN PATENT DOCUMENTS

| | | | |
|---|---|---|---|
| CN | 103222187 | A | 7/2013 |
| WO | 199807127 | | 2/1998 |
| WO | 2018190875 | A1 | 10/2018 |

OTHER PUBLICATIONS

Notification of the First Office Action for Chinese Patent Application No. 201980075960.5 dated Jan. 26, 2022, 8 pages.

* cited by examiner

OPTIMAL CROSSTALK CANCELLATION FILTER SETS GENERATED BY USING AN OBSTRUCTED FIELD MODEL AND METHODS OF USE

CROSS-REFERENCES TO RELATED APPLICATIONS

This application is a continuation of U.S. Non-Provisional patent application Ser. No. 17/295,144, filed May 19, 2021, which is a 371 National Stage filing of PCT Patent Application No. PCT/US2019/062381, filed Nov. 20, 2019, which claims the benefit of U.S. Provisional Patent Application No. 62/770,373, filed Nov. 21, 2018, the disclosures of which are incorporated herein by reference in their entirety.

BACKGROUND

Crosstalk cancellation (also known as "CTC") is an acoustic display technique where loudspeakers are used in place of headphones to deliver binaural signals to human ears. Crosstalk cancellation is one instance of a class of acoustic display techniques called sound field control (also known as "SFC").

In certain instances, crosstalk cancellation performance can be improved by improving the accuracy of the sound field model. In particular, the free-field assumption is violated by the scattering and occlusion effects of the human head and body. These physical effects diminish the quality of binaural localization, since they combine with the virtual effects of scattering and occlusion already present in binaural audio. Improving the accuracy of the sound field model establishes a means to attenuate the presence of physical effects, thus improving the perception of virtual effects.

It would be advantageous if crosstalk cancellation techniques could be improved in terms of any, some, or all sound field control metrics.

BRIEF SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the optimal crosstalk cancellation filter sets using an obstructed field model and methods of use.

The above objects as well as other objects not specifically enumerated are achieved by a crosstalk cancellation filter set configured for use in delivering binaural signals to human ears. The crosstalk cancellation filter set includes a pressure matching system configured to perform spatial filtering or sound field control and an obstructed field model in communication with the pressure matching system. The crosstalk cancellation filter set is configured to take acoustic advantage of scattering effects and occlusional effects caused by violations to a free-field assumption, thereby delivering improved crosstalk cancellation acoustic displays to a listener without the use of headphones.

The above objects as well as other objects not specifically enumerated are also achieved by a method of providing a crosstalk cancellation filter set configured for use in delivering binaural signals to human ears. The method includes the steps of configuring a pressure matching system to perform spatial filtering or sound field control and configuring a spherical head model for communication with the pressure matching system. The crosstalk cancellation filter set is configured to take acoustic advantage of scattering effects and occlusional effects caused by a human head, thereby delivering improved crosstalk cancellation acoustic displays without the use of headphones.

Various objects and advantages of the optimal crosstalk cancellation filter sets using an obstructed field model and methods of use will become apparent to those skilled in the art from the following detailed description, when read in light of the accompanying drawing.

DETAILED DESCRIPTION

Figure 1:
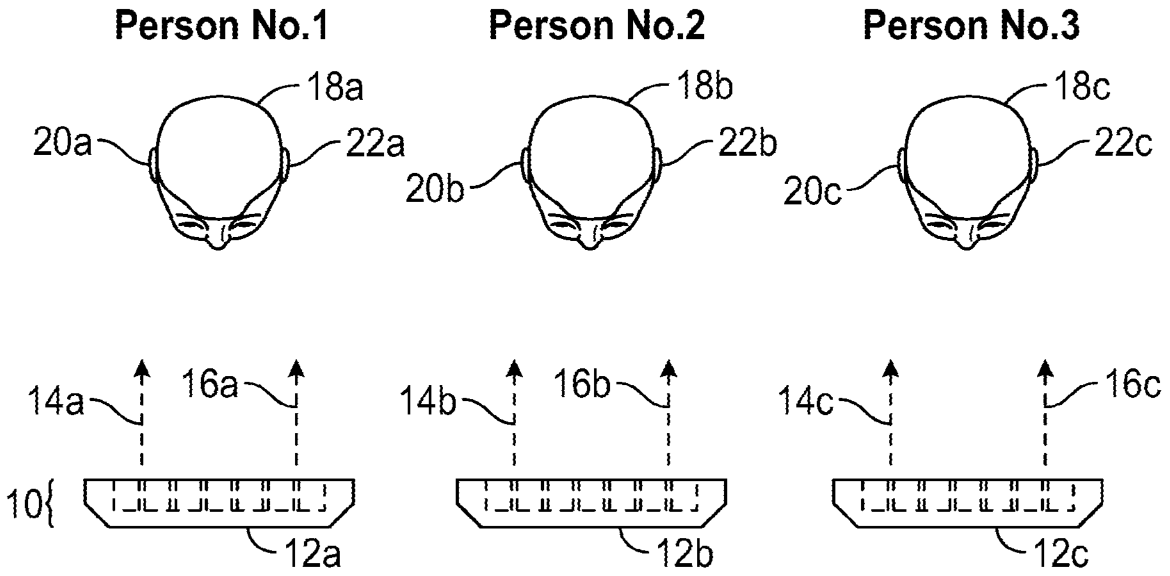
FIG. 1 (Prior Art)
FIG. 1 is a plan view of a plurality of conventional sound field control arrays.

The optimal crosstalk cancellation filter sets generated by using an obstructed field model and methods of use (hereafter "crosstalk cancellation filter sets") will now be described with occasional reference to specific embodiments. The crosstalk cancellation filter sets may, however, be embodied in different forms and should not be construed as limited to the embodiments set forth herein. Rather, these embodiments are provided so that this disclosure will be thorough and complete, and will fully convey the scope of the crosstalk cancellation filter sets to those skilled in the art.

Unless otherwise defined, all technical and scientific terms used herein have the same meaning as commonly understood by one of ordinary skill in the art to which the crosstalk cancellation filter sets belong. The terminology used in the description of the crosstalk cancellation filter sets herein is for describing particular embodiments only and is not intended to be limiting of the crosstalk cancellation filter sets. As used in the description of the crosstalk cancellation filter sets and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the crosstalk cancellation filter sets. Notwithstanding that the numerical ranges and parameters setting forth the broad scope of the crosstalk cancellation filter sets are approximations, the numerical values set forth in the specific examples are reported as precisely as possible. Any numerical values, however, inherently contain certain errors necessarily resulting from error found in their respective measurements.

The term "binaural", as used herein, is defined to mean any stereo (two-channel) audio signal that contains complete, partial, or approximations of head-related transfer function (also known as "HRTF", "anatomical transfer function" or "ATF") components, whether recorded, synthesized, or imparted on an audio signal in another way, so as to reproduce localization cues, and in turn, a virtual auditory environment for a listener. The term "head-related transfer function", as used herein, is defined to mean a response that characterizes how an ear receives a sound from a point in space. As sound strikes the listener, the size and shape of the head, ears, ear canal, density of the head, size and shape of nasal and oral cavities, all transform the sound and affect how it is perceived, boosting some frequencies, attenuating other frequencies, as well as possibly causing frequency-dependent delays. The terms "crosstalk cancellation" or "CTC", as used herein, is defined to mean any system for two-dimensional or three-dimensional audio reproduction. It is a system configured to play binaural stereo signals from loudspeakers.

Physical properties of an array in an obstructed free field produce additional head-related transfer function components that are neither intended nor compensated for by the binaural audio signal itself. In all crosstalk cancellation applications physical head-related transfer functions are known to sum with virtual head-related transfer functions, thereby decreasing the fidelity of the virtual auditory environment intended by a binaural signal in terms of how it is measured at control points, which may or may not include a listener's ears. As a result, the spatial image intended by the binaural signal is degraded.

The description and figures disclose crosstalk cancellation filter sets for use in delivering binaural signals to human ears. Generally, the crosstalk cancellation filter sets are configured to optimize and take advantage of the acoustic scattering and occlusion effects of the human head, thereby delivering improved crosstalk cancellation acoustic displays.

Without being held to the theory, it is believed the crosstalk cancellation filter sets cancel out physical head-related transfer functions while ideally leaving the virtual head-related transfer functions intact. More formally, it is believed the crosstalk cancellation filter sets partially or completely "undo" unintentional acoustic transformations in crosstalk cancellation contexts. The intended result of applying the crosstalk cancellation filter sets is to increase the fidelity of the spatial image and/or virtual auditory environment in crosstalk cancellation contexts.

Referring now to FIG. 1, there is illustrated a conventional loudspeaker assembly 10, configured to include a plurality of conventional sound field control arrays 12*a*-12*c*. Each of the sound field control arrays 12*a*-12*c* is configured to produce and deliver a mix of first acoustic beams, for one input channel, 14*a*-14*c* and second acoustic beams, for a different input channel, 16*a*-16*c* to a plurality of persons 18*a*-18*c*. The first acoustic beams 14*a*-14*c* are directed to the right ears 20*a*-20*c*, respectively, and the second acoustic beams 16*a*-16*c* are directed to the left ears 22*a*-22*c* of the plurality of persons 18*a*-18*c*. Since the first and second beams 14*a*-14*c*, 16*a*-16*c* are optimized for an individual user 18*a*-18*c*, the other users who are not directly in front of a beam-forming array 12*a*-12*c* may hear enhanced audio, but may not experience the full audio effect. In contrast to the conventional loudspeaker assembly 10 illustrated in FIG. 1, advantageously the crosstalk cancellation filter sets described below are scalable and may be used to target either one or many simultaneous listeners who can experience the full audio effect.

In contrast to the conventional loudspeaker assembly 10 illustrated in FIG. 1, advantageously, the crosstalk cancellation filter sets may be used in conjunction with other methods that maximize binaural reproduction accuracy, disregard binaural reproduction accuracy, or attempt to recreate another type of listening experience. A common sound field control objective other than crosstalk cancellation is acoustic privacy, in which acoustic pressure is formed into beams and beam width is minimized. The two sound field control goals, beam width and crosstalk cancellation are distinct, but also compatible. Potentially, optimal filter sets can be defined to mean filter sets that simultaneously minimize beam width and maximize crosstalk cancellation.

Figure 2:
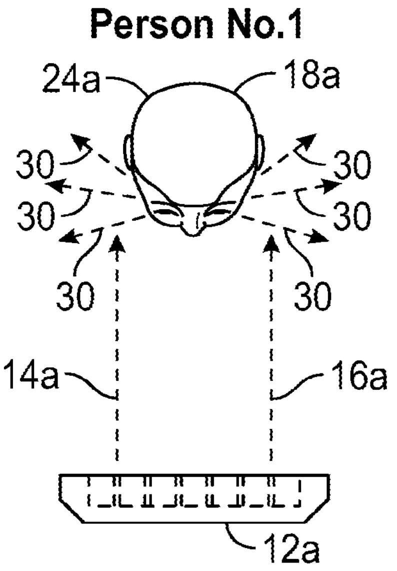
FIG. 2 (Prior Art)
FIG. 2 is a plan view of a beam form array of FIG. 1, illustrating the scattering and occlusion effects of a human head.

Referring now to FIG. 2, the conventional beam-forming array 12*a*, first and second acoustic beams 14*a*, 16*a* and the first person 18*a* are illustrated. The conventional free-field assumption provides that no sound reflections occur and the entire sound is to be determined by the first person 18*a* as it is received through the direct sound from the conventional beamforming array 12*a*. However, in certain instances, the free-field assumption can be violated when the scattering and occlusion effects, schematically illustrated by direction arrows 30 of the human head 24*a* are considered.

Figure 3:
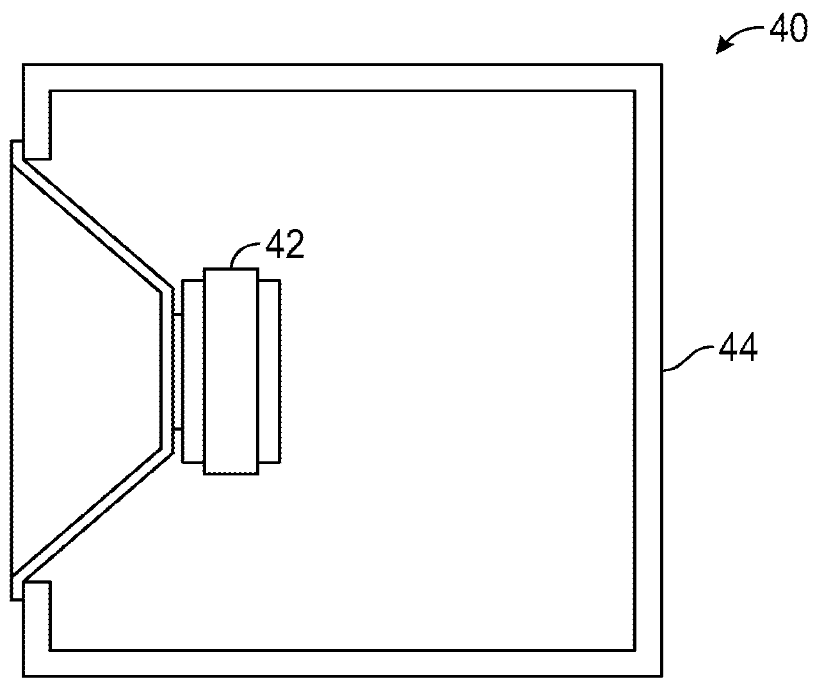
FIG. 3 (Prior Art)
FIG. 3 is a side view of a conventional loudspeaker, illustrating a driver and an enclosure.

Referring now to FIG. 3, a conventional loudspeaker is illustrated at 40. The term "loudspeaker", as used herein, is defined as the combination of a driver 42 and an enclosure 44. The driver 42 is well known in the acoustic arts and is configured to produce sound. The driver 42 is an example of an acoustic source. The driver 42 has simple acoustic properties such as the non-limiting examples of directivity and equalization (commonly called "EQ" (frequency-dependent loudness)). The term "directivity", as used herein, is defined to mean a measure of the directional characteristic of a sound source or position-dependent loudness. The term "equalization", as used herein, is defined to mean the frequency dependent loudness.

Referring again to FIG. 3, the enclosure 44 is configured to contain the driver 42 and does not produce sound on its own. The enclosure 44 can obstruct sound originating from the driver 42, which in certain instances can causes position-dependent and frequency-dependent changes to the loudness and phase of the driver 42 at control points. Accordingly, the enclosure 44 inherits the acoustic properties of the enclosed driver 42. The interaction between the driver 42 and the enclosure 44 produces a singular acoustic source, the loudspeaker 40, with more complicated acoustic properties than the driver or enclosure alone. The acoustic properties of the loudspeaker 40 can be described by a transfer function. The transfer function may transform both loudness and phase in position-dependent and frequency-dependent manners. The transfer function for the loudspeaker 40 can be combined with that of a head-related transfer function to produce filter sets configured to compensate for both loudness and phase.

Conventional pressure matching methods can use an array, which is an ensemble of loudspeakers, each combined with filter sets, to perform spatial filtering or sound field control. Control points are sometimes referred to as either "bright spots" (as in the existence of acoustic pressure) or dark spots (no acoustic pressure). The free-field transfer function is estimated between the L loudspeakers and the M control points. At a given frequency, a column vector of complex filter weights (which can be converted into magnitude and phase) are determined to optimize the pressure at the control points. This can be described using the matrix notation:

$$p=Zq$$

where p is defined as a column vector of acoustic pressure at M control points, q is defined as a column vector of L complex weights (one per loudspeaker) and Z is defined as the transfer function matrix with dimensions M×L describing the acoustic transfer function between each driver and each control point. An inverse matrix $Z^{-1}$ (defined as the exact solution to $I=AA^{-1}$), or a pseudoinverse matrix $Z^{+}$ (defined as the approximation of an inverse that allows error $I \approx AA^{+}$), is used to either solve or approximate spatial filter sets q at one or more arbitrary frequencies. For each driver, this sequence of spatial filter sets at one or more frequencies is transformed into a time domain filter. The ensemble of acoustic drivers and filter sets work together to form desired sound field response(s).

The term "pseudoinverse", as used herein, is defined to mean either or both inverse and pseudoinverse. The statement $I \approx AA^{+}$ includes the possibility that $I=AA^{-1}$. The term "inverse problem", as used herein, is defined to mean a problem that can be solved via this general definition of pseudoinverse.

This method is well suited to the general problem of beam forming. Crosstalk cancellation is an acoustic display technique where loudspeakers are used in place of headphones to deliver binaural signals to human ears. In certain instances, the crosstalk cancellation technique can be improved with the use of beam forming techniques. However, the free-field assumption can be violated when the scattering and occlusion effects of the human head are considered, as shown in FIG. 2.

Figure 4:
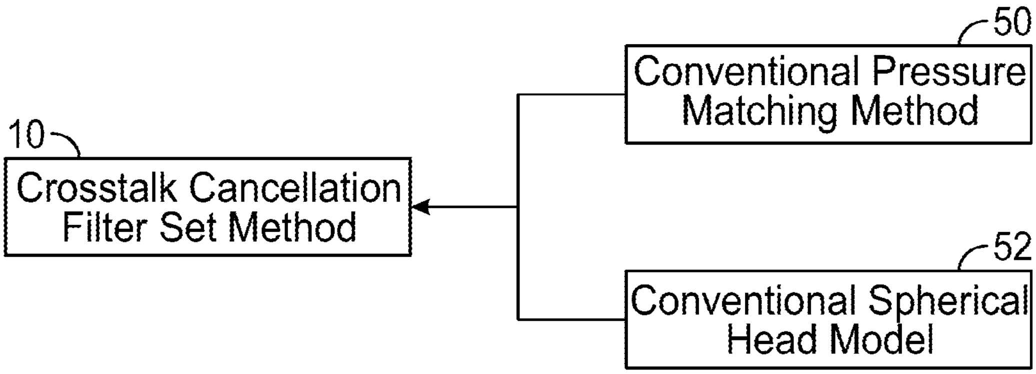
FIG. 4 is a schematic drawing of a crosstalk cancellation filter set incorporating a pressure matching system and a spherical head model.

Novel and innovative crosstalk cancellation filter sets are provided. The crosstalk cancellation filter sets are configured to optimize and take acoustic advantage of the scattering and occlusion effects of the human head, thereby delivering improved crosstalk cancellation acoustic displays without the use of headphones. Referring now to FIG. 4, a first embodiment of a crosstalk cancellation filter set 10 includes a pressure matching system 50 in communication with a spherical head model 52, thereby accounting for and taking advantage of the acoustic shadowing and time delay caused by a human head. It is contemplated that the pressure matching system 50 can be a dedicated system, a combination of pressure matching systems, hybrid variations of pressure matching systems, and/or newly discovered pressure matching systems. It is further contemplated that the spherical head model 52 can be a dedicated model, a combination of models, hybrid variations of models, and/or newly spherical head models.

Figure 5:
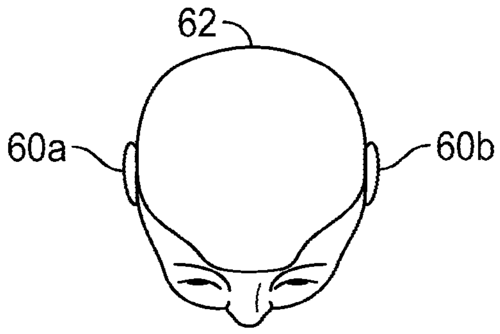
FIG. 5 is a plan view of a human head illustrating control points established by the ears on the human head.

Referring now to FIG. 5, the crosstalk cancellation filter set 10 uses a propagation matrix X in place of the free-field propagation matrix Z, thereby providing the matrix notation:

$$p=Xq$$

Referring again to FIG. 5, the control points 60*a*, 60*b* are defined as locations on a generally spherical head 62. However, it should be appreciated that in other embodiments, small displacements of the spherical head 62 can be used to define other control points or to represent movements of the listener's head 62. A propagation between each driver and the control points 60*a*, 60*b* can be computed using, for example, the spherical head model, which is a numerical approximation of the Rayleigh solution for the acoustic pressure on a rigid sphere. The matrix X describes the acoustic transfer function between each driver and each control point 60*a*, 60*b*.

Figure 6:
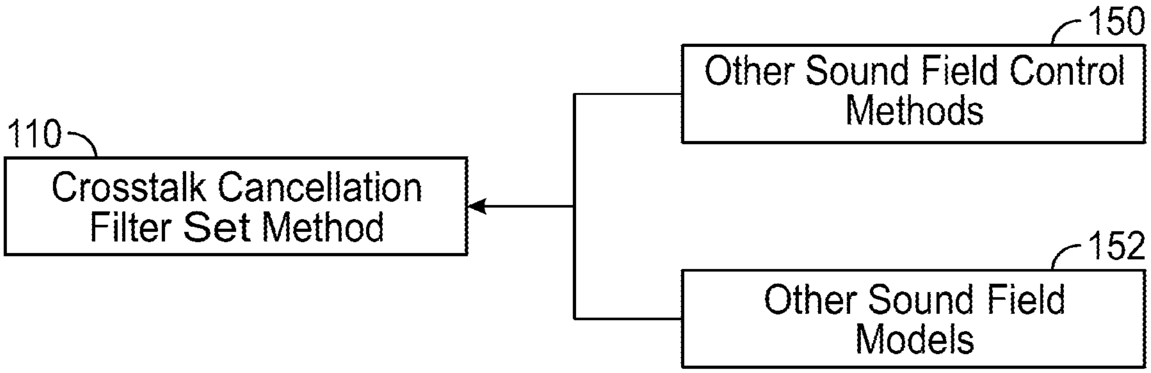
FIG. 6 is a schematic drawing of a crosstalk cancellation filter set incorporating other pressure matching systems and other spherical head models.

Referring now to FIG. 6, a second embodiment of the crosstalk cancellation filter set is shown generally at 110. The crosstalk cancellation filter set 110 combines other sound field control methods 150 with other sound field models 152 to generate optimal obstructed field filter sets. It is contemplated that the other sound field control methods 150 can include combinations of sound field control methods, hybrid variations of sound field control methods 150, and/or newly discovered sound field control methods. Non-limiting examples of other sound field control methods 150 include acoustic contrast maximization (also referred to as "ACM"), or planarity control (also referred to as "PC"). It is further contemplated that the other sound field models 152 can include combinations of sound field models, hybrid variations of sound field models, and/or newly discovered sound field models. Non-limiting examples of sound field models 152 include loudspeaker transfer functions, the blockhead head-related transfer function model, or measured head-related transfer function from a database.

While the crosstalk cancellation filter sets 10, 110 illustrated in FIGS. 5 and 6 have been described above in reference to the generally spherical head 62, it is further contemplated that in other embodiments the crosstalk cancellation filter sets 10, 110 can have as a foundation measurement-based occlusion. In these embodiments, the transfer function matrix X might be composed of either model-based transfer functions, measurement-based, or combinations thereof.

Referring again to FIGS. 4-6, there are numerous benefits in the crosstalk cancellation filter sets 10, 110, although not all benefits may be available in all embodiments. First, advantageously, the crosstalk cancellation filter sets 10, 110 are configured to deliver independent signals at a much lower frequency, thereby resulting in a superior spatial impression. Second, the simulated field used in the filter set design more readily reflects the actual listening conditions. In free-field prior art, the intended acoustic interference would have been disrupted by the pressure of the head and the pressure field would be degraded. The achieved ear separation, that is, the ability to deliver distinct binaural signals to an ear is greatly improved in the perceptually significant region below roughly 1 kHz. Third, low-frequency extension is improved as a result having improved several other more general sound field control metrics, including matrix condition, numerical stability, error, effort, and spectral flatness.

The term "matrix condition", as used herein, is a metric invoked when sound field control is cast as an inverse problem. The matrix condition can be improved by substituting matrix elements, such as for example, replacing free-field transfer functions with head-related transfer functions or other types of suitable transfer function. Improved matrix condition in sound field control is often but not always a beneficial side-effect of acoustic shadowing. Improving the matrix condition causes other important sound field control metrics to improve as well.

The term "numerical stability", as used herein, refers to a metric related more directly to inverse problems (mathematical situations where the solution requires the calculation of a matrix pseudoinverse), than sound field control problems. When a matrix is ill conditioned, or rather has a high condition number, its pseudoinverse can become unstable. Numerically, instability causes small changes to an ill-conditioned matrix to produce disproportionately large changes in its pseudoinverse. The ideal rates of change to a matrix and its pseudoinverse should be 1:1. Acoustically, instability causes small errors in physical parameters and models, such as the non-limiting examples of speaker or control point positions or errors in the transfer function matrix, to result in disproportionately large errors in the sound field.

The term "error", as used herein, refers to a sound field control metric that shows the difference between intended and actual control point responses. When the ratio of intended responses is high, such as the non-limiting example of a crosstalk cancellation method intended responses of 1:0=inf, error can also be described by the term "ear separation". Optimal obstructed field filter sets can be built in order to minimize error in terms of either ear separation, or more general numerical error. Some instances of sound field control may focus on minimizing one type of error over another type of error.

The term "effort", as used herein, refers to a distribution of gain across an array. In all cases, low effort is better than high effort, though due to the physical differences in length between low frequency wavelengths, and human interaural distances, low effort is more difficult to achieve at low frequencies.

The term "spectral flatness", as used herein, refers to the distribution of gain across frequencies. Since filter sets can be built from independent solutions at multiple frequencies, the acoustic properties of filter sets depend on frequency. In practice, transaural systems require more effort as frequency decreases. The result is that filter sets have significantly varied spectra which listeners are sensitive to, even when they are in the ideal listening location.

In accordance with the provisions of the patent statutes, the principle and mode of operation of the crosstalk cancellation filter sets and method of use have been explained and illustrated in a certain embodiment. However, it must be understood that the crosstalk cancellation filter sets and method of use may be practiced otherwise than as specifically explained and illustrated without departing from its spirit or scope.

What is claimed:

1. A crosstalk cancellation filter set, the crosstalk cancellation filter set being configured for use in delivering binaural signals to human ears in an obstructed free field, the crosstalk cancellation filter set comprising:

a pressure matching system configured to perform spatial filtering or sound field control based on an acoustic shadowing effect caused by a human head and a time delay effect caused by the human head; and a spherical head model in communication with the pressure matching system, wherein:

the crosstalk cancellation filter set is configured to take acoustic advantage of scattering effects and occlusional effects caused by violations to a free-field assumption by the human head, thereby delivering improved crosstalk cancellation to a listener without use of headphones; and a propagation is computed considering a driver and control points using a numerical approximation of a Rayleigh solution for an acoustic pressure on a rigid sphere.

2. The crosstalk cancellation filter set as recited in claim 1, wherein the crosstalk cancellation filter set considers measurement-based occlusion of the human head.

3. The crosstalk cancellation filter set as recited in claim 1, wherein the spherical head model establishes control points at defined positions of the human head.

4. The crosstalk cancellation filter set as recited in claim 3, wherein the spherical head model establishes control points at one or more ears of a person.

5. The crosstalk cancellation filter set as recited in claim 1, wherein the pressure matching system optimizes pressure at control points.

6. The crosstalk cancellation filter set as recited in claim 1, wherein the crosstalk cancellation filter set is applied to sound output via a plurality of loudspeakers.

7. The crosstalk cancellation filter set as recited in claim 1, wherein:

the crosstalk cancellation filter set is defined by a matrix notation; and the matrix notation is defined by a propagation matrix and a column vector of complex weights.

8. The crosstalk cancellation filter set as recited in claim 7, wherein the column vector of complex weights includes one or more drivers having a length.

9. A method of providing a crosstalk cancellation filter set, the crosstalk cancellation filter set being configured for use in delivering binaural signals to human ears in an obstructed free field, the method comprising:

configuring a spherical head model for communication with a pressure matching system; and configuring the pressure matching system to perform spatial filtering or sound field control based on an acoustic shadowing effect caused by a human head and a time delay effect caused by the human head;

wherein a propagation is computed considering a driver and control points using a numerical approximation of a Rayleigh solution for an acoustic pressure on a rigid sphere.

10. The method of providing a crosstalk cancellation filter set as recited in claim 9, further comprising considering measurement-based occlusion of the human head.

11. The method of providing a crosstalk cancellation filter set as recited in claim 9, further comprising establishing control points at defined positions of the human head.

12. The method of providing a crosstalk cancellation filter set as recited in claim 11, further comprising establishing the control points at one or more ears of a person.

13. The method of providing a crosstalk cancellation filter set as recited in claim 9, further comprising optimizing, by the pressure matching system, pressure at control points.

14. The method of providing a crosstalk cancellation filter set as recited in claim 9, further comprising outputting, via a plurality of speakers, sound to which the crosstalk cancellation filter set is applied.

15. The method of providing a crosstalk cancellation filter set as recited in claim 9, wherein the crosstalk cancellation filter set is defined by a matrix notation, and wherein the matrix notation is defined by a propagation matrix and a column vector of complex weights.

16. The method of providing a crosstalk cancellation filter set as recited in claim 15, wherein the column vector of complex weights includes one or more drivers having a length.

17. One or more non-transitory, machine-readable media having machine-readable instructions thereon which, when executed by one or more processing devices, cause the one or more processing devices to perform operations comprising:

configuring a spherical head model for communication with a pressure matching system; and configuring the pressure matching system to perform spatial filtering or sound field control based on an acoustic shadowing effect caused by a human head and a time delay effect caused by the human head;

wherein a propagation is computed considering a driver and control points using a numerical approximation of a Rayleigh solution for an acoustic pressure on a rigid sphere.

18. The one or more non-transitory, machine-readable media as recited in claim 17, the operations further comprising considering measurement-based occlusion of the human head.

* * * * *